Oct. 6, 1970  S. C. SWATTON  3,532,301
VERTICAL LIFT AIRCRAFT
Filed March 21, 1968  4 Sheets-Sheet 1
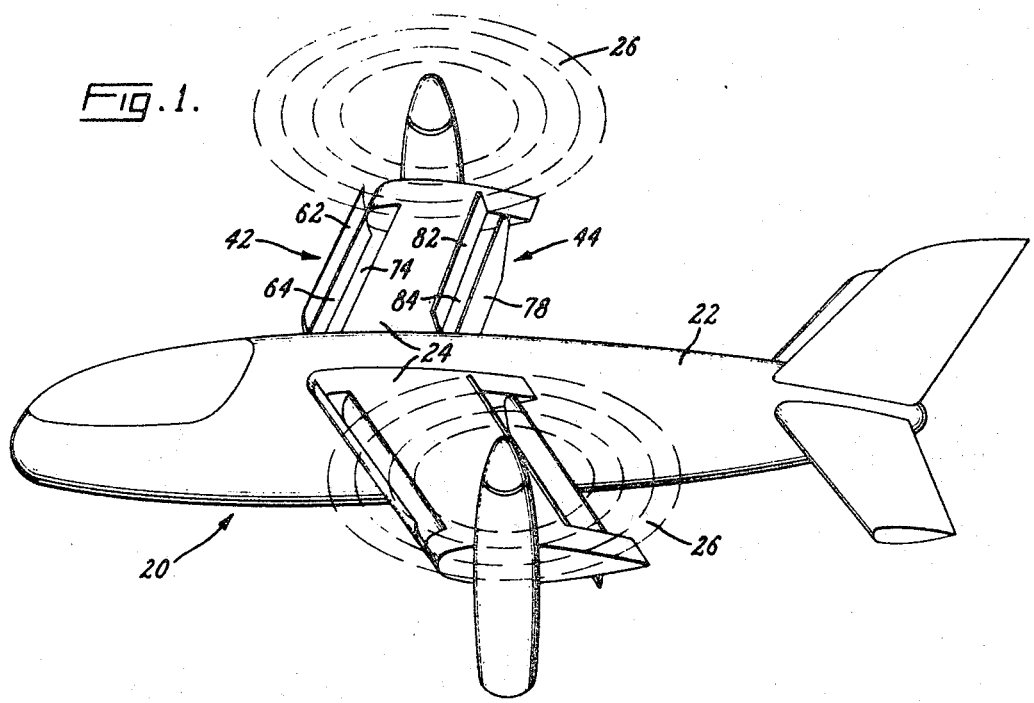
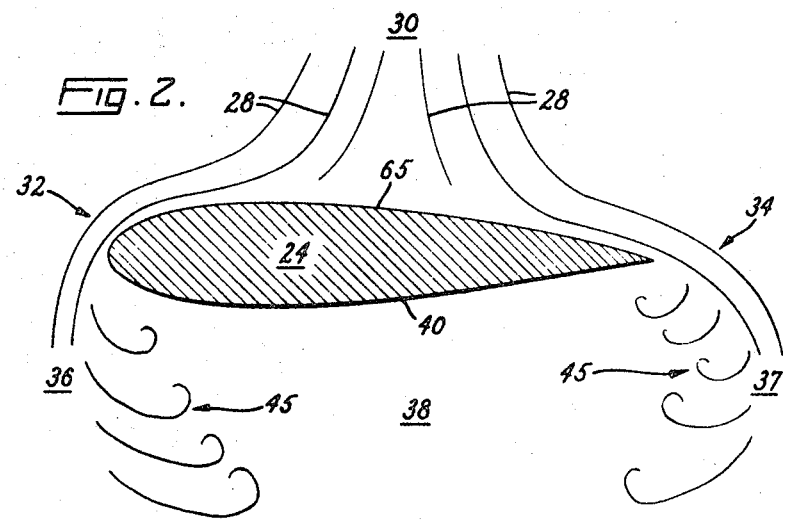
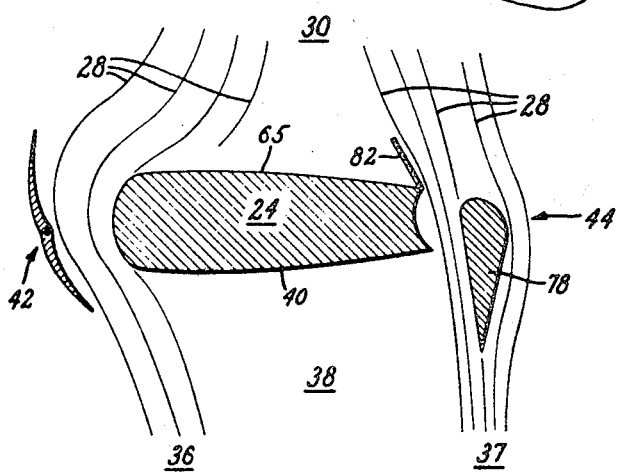
INVENTOR:
Sidney C. Swatton,
BY *Albertus Hilburger*
ATTORNEY Oct. 6, 1970 — S. C. SWATTON — 3,532,301
VERTICAL LIFT AIRCRAFT
Filed March 21, 1968 — 4 Sheets-Sheet 2
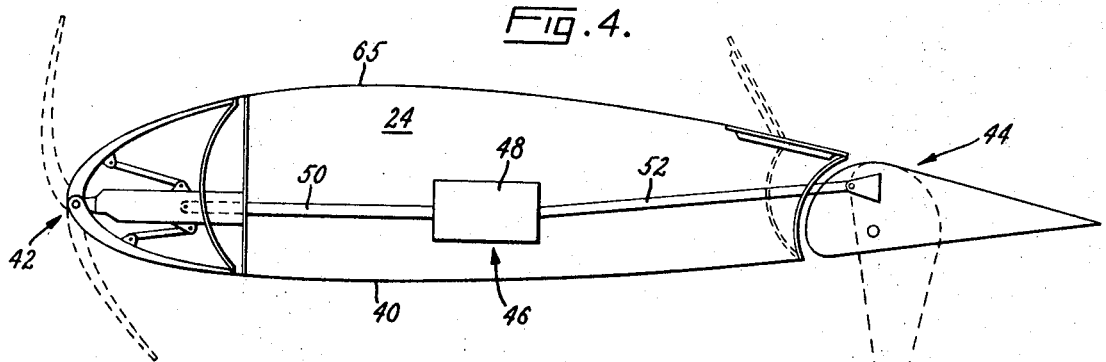
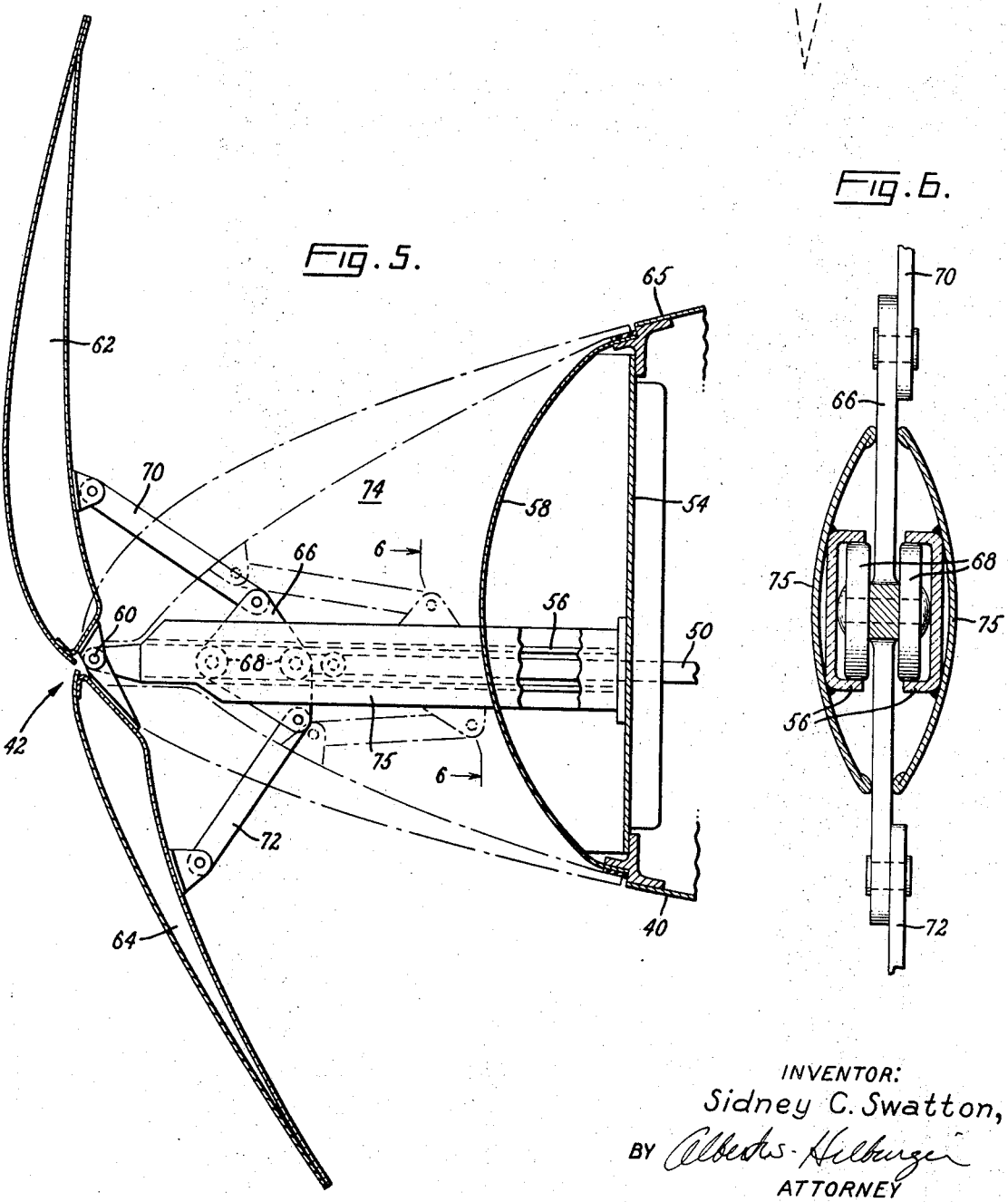
INVENTOR:
Sidney C. Swatton,
BY *Alberts Hilburger*
ATTORNEY

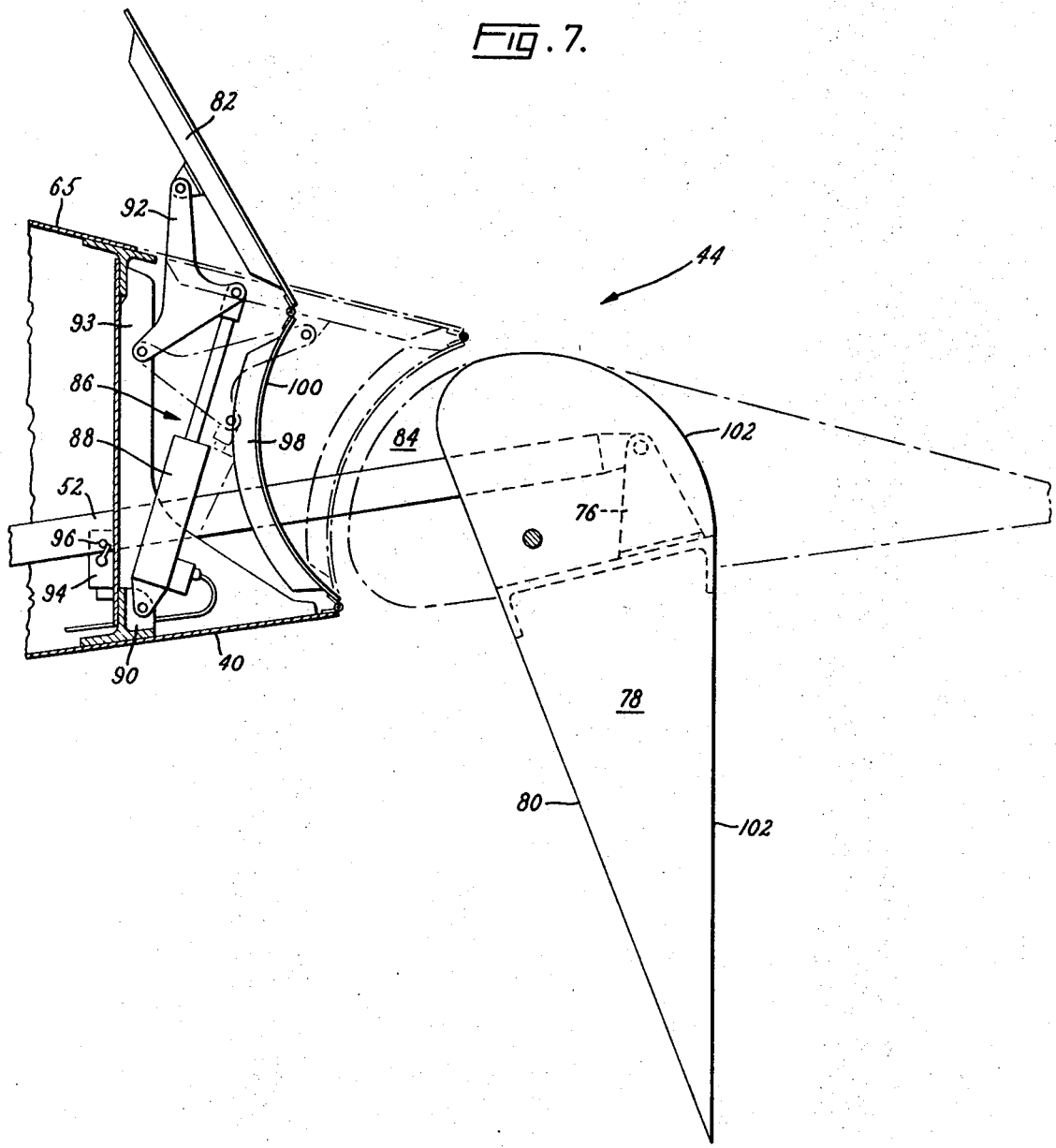

Oct. 6, 1970      S. C. SWATTON      3,532,301
VERTICAL LIFT AIRCRAFT
Filed March 21, 1968      4 Sheets-Sheet 4
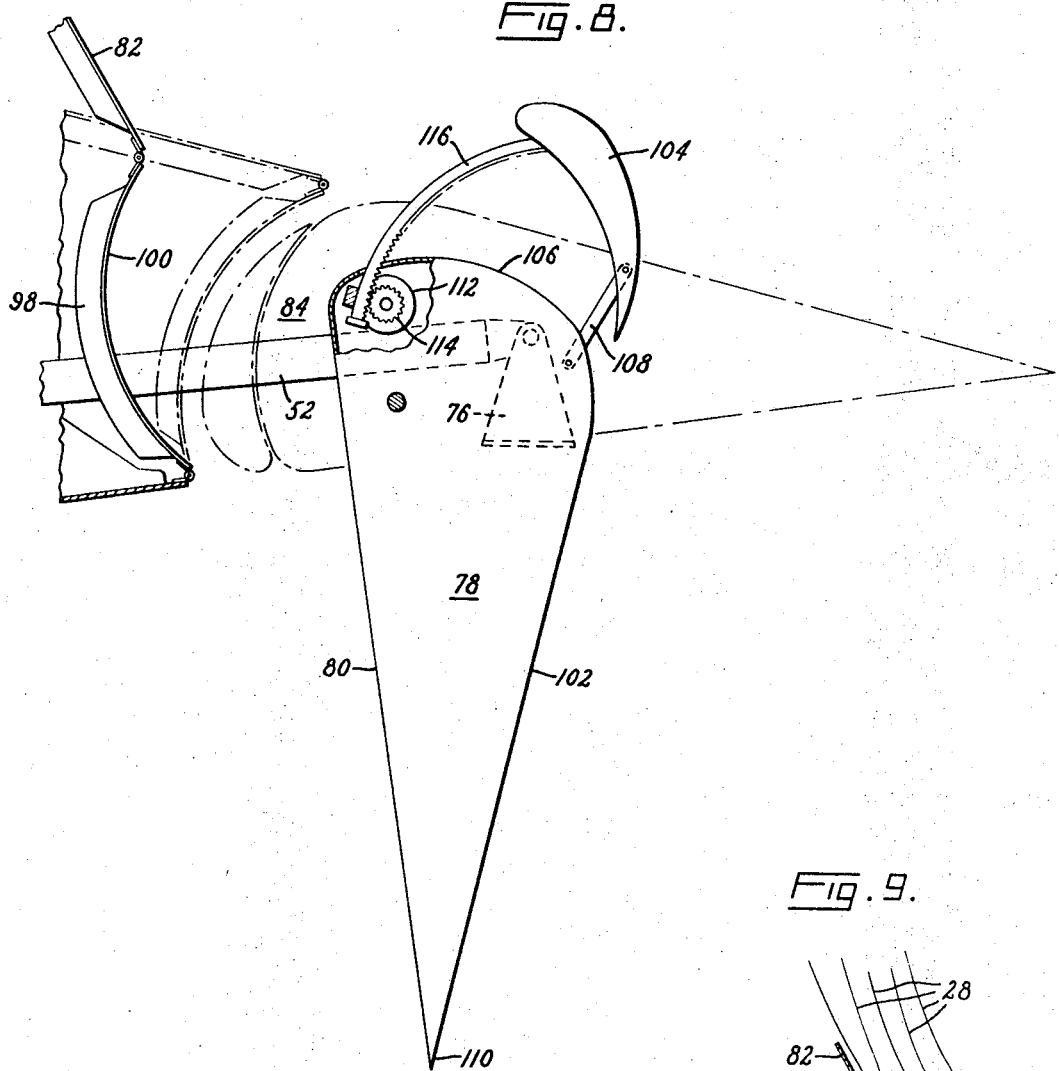
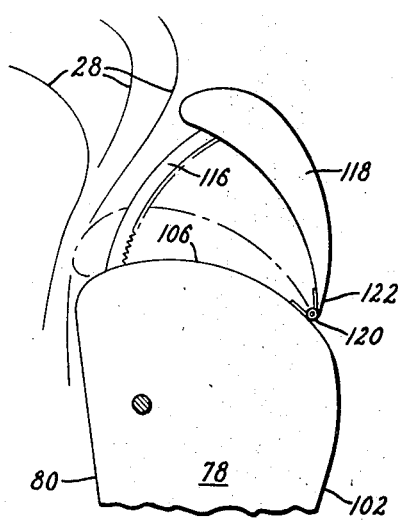
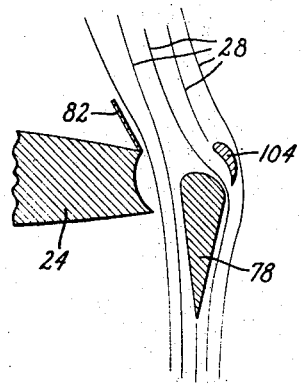
INVENTOR:
Sidney C. Swatton,
BY
ATTORNEY United States Patent Office 3,532,301
Patented Oct. 6, 1970

3,532,301
VERTICAL LIFT AIRCRAFT
Sidney C. Swatton, Brookhaven, Pa., assignor to The Boeing Company, Seattle, Wash., a corporation of Delaware
Filed Mar. 21, 1968, Ser. No. 714,821
Int. Cl. B64c 23/00
U.S. Cl. 244—12                                  12 Claims

ABSTRACT OF THE DISCLOSURE

Apparatus for reducing download on a vertical lift aircraft. Control mechanisms at leading and trailing portions of a lifting surface positioned in a downwardly directed slipstream are movable between retracted and extended positions. In the extended positions, these control mechanisms are effective to decrease the area of the lifting surface projected into the slipstream, to reduce the magnitude of a low pressure region created beneath the aircraft by the slipstream, and to so guide the slipstream from a zone above the lifting surface to zones beneath the lifting surface that turbulence is held to a minimum.

This invention relates generally to vertical lift aircraft and specifically to apparatus for reducing download on aircraft of the vertical lift variety.

Certain types of vertical lift aircraft employ propellers or rotors which provide lift by producing a downwardly directed slipstream. During operation of the aircraft, a region of increased pressure is created above those surfaces of the aircraft which are projected into the slipstream and a region of reduced pressure is created beneath those surfaces which face away from the slipstream. For those types of vertical lift aircraft which employ a fixed wing, such an increased pressure region occurs adjacent the upper surface of the wing and such a reduced pressure region occurs adjacent the underside of the wing and together, these cause a vertical drag or "download" on the aircraft requiring that the thrust of the rotor be sufficient not only to lift the aircraft at a desired rate but also to overcome the download.

In the past, various devices have been considered for reducing the effect of download on a vertical lift aircraft so as to improve performance. These devices were chiefly concerned with construction adapted to provide a passage through the body of the aircraft to permit airflow from a zone above the body to a zone beneath the body. In some instances, these prior known devices required a substantial increase in the weight of the aircraft thereby offsetting any benefits achieved by the reduction of download.

The present invention is an improvement on these known devices and includes apparatus to guide the slipstream into a relatively strict flow pattern as well as to reduce the projected area of the aircraft exposed to the slipstream. To this end, control mechanisms are provided at both the leading and trailing edges of the wing. These mechanisms employ a minimum of structure additional to that of a conventional wing and are movable between retracted and extended positions. In their extended positions, these control mechanisms are effective to decrease the area of the wing projected into the slipstream, to reduce the magnitude of the low pressure region created beneath the wing by the slipstream, and to so guide the slipstream from a zone above the wing to a zone beneath the wing that turbulence is held to a minimum.

Specifically, the leading edge control mechanism adjacent forward portions of the wing includes upper and lower vanes pivotally mounted for movement between closed and open positions. In their closed positions, the vanes are substantially flush respectively with, upper and lower surfaces of the wing thereby defining a leading edge of the wing. When swung to the open position, the upper vane is angularly disposed in an upward direction relative to the upper surfaces and the lower vane is angularly disposed in a downwardly direction relative to the lower surfaces. Together with a cooperating fairing on the wing spaced from the upper and lower vanes in a direction toward the trailing edge of the wing, the vanes are effective to reduce the area of the wing exposed to the slipstream and to guide the slipstream through a cavity in the wing defined by the vanes and the fairing so as to assure non-turbulent flow and to reduce the magnitude of the low pressure region beneath the wing.

The trailing edge control mechanism adjacent aft portions of the wing cooperates with the leading edge control mechanism to guide the slipstream and functions in a similar manner. For this purpose, a control surface such as a flap or aileron is movable between an inactive position substantially within a chord plane of the wing and an active position inclined downwardly relative to the chord plane. Cooperating with the control surface is a panel adjacent the control surface and movable between a lowered position flush with an upper surface of the wing and a raised position inclined upwardly and generally toward the leading edge of the wing. With the panel in the raised position and the control surface in the active position, the panel is effective to guide the slipstream onto a bottom surface of the control surface so as to prevent separation of the slipstream from the control surface and to maintain streamline flow of the slipstream for a substantial distance beneath the wing. To prevent separation of the slipstream from a top surface of the control surface, a slat is preferably provided adjacent a fore edge of the control surface and movable between a withdrawn portion proximate the fore edge when the control surface is in the inactive position and a protracted position spaced from the fore edge when the control surface is in the active position.

Accordingly, a primary object of the invention is to provide new and improved apparatus for improving performance of a vertical lift aircraft.

Another object of the invention is to provide new and improved apparatus for reducing download on a vertical lift aircraft.

A further object of the invention is to provide a new and improved aircraft positioned in a downwardly moving slipstream, and having a control mechanism for reducing the effective size of a resultant region of reduced pressure beneath the aircraft.

Still another object of the invention is the provision of a new and improved vertical lift aircraft having a control mechanism for decreasing the area of a lifting surface projected into a downwardly directed slipstream. A related object is the provision of such a control mechanism which is effective to reduce the magnitude of a low pressure region created beneath the aircraft by the slipstream. Another related object is the provision of such a control mechanism which is effective to guide the slipstream from a zone above the lifting surface to a zone beneath the lifting surface and resulting in a minimum of turbulence.

A further object of the invention is the provision of a new and improved vertical lift aircraft having control mechanisms adjacent both the leading edge and the trailing edge of a lifting surface to reduce download created by a downwardly directed slipstream.

Other and further objects and advantages are obvious or will be presented in the description which follows, taken together with accompanying drawings in which like numerals refer to like parts throughout.

In the drawings:

FIG. 1 is a perspective view of a vertical lift aircraft embodying the present invention;

FIG. 2 is a schematic cross-sectional view taken through a wing of the aircraft illustrated in FIG. 1 positioned within a downwardly directed slipstream and having certain parts in retracted positions;

FIG. 3 is a schematic cross-sectional view similar to FIG. 2 and illustrating the parts in extended positions;

FIG. 4 is a schematic cross-sectional view taken through a wing of the aircraft illustrated in FIG. 1 to reveal apparatus for achieving the configurations of FIGS. 2 and 3;

FIG. 5 is an enlarged cross-sectional view of parts illustrated in FIG. 4 adjacent a leading portion of the wing;

FIG. 6 is a cross-sectional view taken along lines 6—6 in FIG. 5;

FIG. 7 is an enlarged cross-sectional view of parts illustrated in FIG. 4 adjacent an aft portion of the wing;

FIG. 8 is an enlarged cross-sectional view illustrating a modified embodiment of the mechanism shown in FIG. 7;

FIG. 9 is a schematic cross-sectional view, taken through a portion of a wing modified according to FIG. 8 to indicate the slipstream from a lift impeller with certain parts in extended positions; and FIG. 10 is detail side elevation illustrating another modified embodiment of the mechanism shown in FIG. 8 and indicating flow of the resulting slipstream.

Refer now to the drawings and initially to FIG. 1 illustrating a vertical lift aircraft 20 including a fuselage 22, airfoils or wings 24, and lift rotors 26 pivotally mounted adjacent tips of the wings and adapted to provide lift for the aircraft 20. The wings 24 are preferably integral with the fuselage 22 and, being positioned in the slipstream from the lift rotors 26, undesirably cause a vertical drag or download.

This phenomenon is more clearly shown in FIG. 2, in which the wing 24 is positioned in a slipstream from the lift rotors 26. The slipstream is defined by streamlines 28 which flow from a first zone 30 above the wing 24, around leading and trailing portions 32 and 34, respectively, toward second zones 36 and 37 beneath the wing 24. A region 38 of reduced pressure results from the slipstream and is substantially defined by a lower surface 40 of the wing 24 and the second zones 36 and 37. As seen in FIG. 3, a forward control mechanism 42 and an aft control mechanism 44 cooperate when moved to extended positions to direct the streamlines 28 from the first zone 30 toward the second zones 36 and 37 in such a manner as to reduce the magnitude of the region 38 and, therefore, download on the aircraft 20. Simultaneously, the mechanisms 42 and 44 serve to reduce the effective area of the wing 24 projected into the slipstream from the lift rotors 26 and also operate so as to avoid turbulent eddy currents 45 beneath the leading and trailing portions 32 and 34, respectively, as illustrated in FIG. 2. Furthermore, it has been determined that download is reduced to a minimum if the zones 36 and 37 are prevented from intermingling for a distance beneath the wing 24 at least equal to, and preferably greater than, two chord lengths of the wing. The mechanisms 42 and 44 are effective in their extended positions to so guide the streamlines 28 across the leading and trailing portions, 32 and 34 respectively, that their intermingling is delayed for the desired distance.

An over-all view of the mechanisms employed to achieve the afore-mentioned results is presented in FIG. 4. Specifically, an actuating mechanism 46 is provided to move the forward and aft control mechanisms 42 and 44, respectively, between their inoperative and operative positions. The actuating mechanism 46 includes an actuator 48 such as a screw pack or the like for operating a forward control rod 50 to actuate the forward control mechanism 42 and an aft control rod 52 for actuating the aft control mechanism 44.

Turn now to FIG. 5 in which a forward spar 54 of the wing 24 and extending the length thereof in a direction parallel with leading portions 32 of the wing 24 is suitably apertured to slidingly receive the forward control rod 50. One end of a suitable track 56 (FIGS. 5 and 6) is fixed to the forward spar 54 and at locations intermediate its ends extend through and is suitably mounted on a convex fairing 58 integral with the wing 24. Thus, the track 56 is cantilevered forwardly of main structure of the wing 24 and the fairing 58 provides an additional support in aid of the spar 54. Adjacent a forwardmost end of the track 56, a hinge 60 pivotally mounts an upper vane 62 and a lower vane 64. As the forward control rod 50 is moved in a forward direction (to the left in FIGS. 4 and 5), the vanes 62 and 64 move from closed positions (phantom lines in FIG. 5) substantially flush with upper and lower surfaces 65 and 40, respectively, of the wing 24 and open positions (solid lines in FIG. 5) angularly disposed relative to the respective surfaces. For this purpose, a bracket 66 fixed to a free end of the forward control rod 50 and provided with rollers 68 rotatably engaged with the track 56 is connected to the upper vane 62 by means of an upper link 70 and to the lower vane 64 by means of a lower link 72. It is preferred that when the forward control rod 50 is in the extended position, the upper vane 62 lies in a plane substantially perpendicular to a chord plane of the wing 24 and the lower vane lies in a plane extending downwardly of the chord plane and slightly rearwardly (solid lines in FIG. 5).

In this manner, the upper vane 62 exposes its smallest dimension to the slipsteam from the lift rotors 26. Additionally, with the aid of the fairing 58, the vane 62 is effective to collect the slipstream and re-direct the streamlines 28 (FIG. 3) so that they flow smoothly through a cavity 74 defined between the fairing 58 and the vanes 62 and 64 and onto and along the lower vane 64 in a substantially tangential manner. With the lower vane 64 suitably positioned in a downwardly and slightly rearwardly direction, the streamlines 28 are urged to flow according to a pattern (FIG. 3) which is effective to substantially contract the reduced pressure region 38 while assuring that the zone 36 does not merge with the zone 37 for a distance beneath the wing 24 at least equal to, and preferably greater than, two chord lengths of the wing. As a further aid in maintaining streamline flow through the fore cavity 74, streamlined fairings 75 (FIGS. 5 and 6) are suitably fixed to the tracks 56 and extend for substantially the length of the tracks.

Viewing FIG. 7, the aft control rod 52 is pinned at its free end to a lug 76 fixed to a control surface 78, such as a flap or aileron, pivotally mounted for movement between an inactive position (phantom lines) substantially within the chord plane of the wing 24 and an active position (solid lines) inclined downwardly relative to the chord plane. To direct the streamlines 28 (see FIG. 3) onto and along a bottom surface 80 of the control surface 78 in a manner to assure that flow separation is prevented, a panel 82 is provided, movable between a lowered position (phantom lines in FIG. 7) flush with the upper surface 65 of the wing 24 and a raised position (solid lines in FIG. 7) inclined upwardly and generally toward the leading portions 32 of the wing 24. The panel 82 serves to guide the streamlines 28 through an aft cavity 84 and onto and along the bottom surface 80 of the control surface 78. When the panel 82 is properly positioned, flow separation along the bottom surface 80 is prevented and the streamlines 28 assume a configuration as illustrated in FIG. 3 as they flow into the second zone 37. Thus, the panel 82 and the control surface 78 are mutually cooperable to assure a non-turbulent flow condition while reducing the projected area of the wing exposed to the slipstream and maintaining a contracted reduced pressure region 38.

The actuating mechanism 46 (FIG. 4) includes an operating unit 86 (FIG. 7) for moving the panel 82 between its lowered and raised positions. The operating unit 86 includes an extensible member 88 such as a fluid operated ram pivotally mounted at one end to a structural member 90 integral with the wing 24 and at its opposite end to a bell crank 92 pivotally mounted to another structural member 93 integral with the wing. In turn, the bell crank 92 is pinned to the panel 82 whereby movement of the extensible member 88 results in raising or lowering the panel 82, as desired. In order to assure that the panel 82 does not assume the raised position until the control surface 78 has assumed a fully active position (solid lines in FIG. 7), a delay mechanism as, for example, a switch 94, is positioned adjacent the aft control rod 52. When a suitable knob 96 on the aft control rod 52 reaches a predetermined position, it is effective to energize the switch 94 to initiate operation of the operating unit 86.

Pivotally mounted along opposite edges to the lower surface 40 of the wing 24 and to the panel 82, a cove member 98 is provided with a concave surface 100 so as to move from a phantom line position (FIG. 7) when the panel 82 assumes its lowered position to a solid line position (FIG. 7) when the panel 82 assumes a raised position. Thus, when the control surface 78 and the panel 82 are moved to their solid lines positions (FIG. 7), the aft cavity 84 is substantially enlarged to permit a maximum rate of flow of the slipstream from the first zone 30 to the second zone 37.

By reason of the panel 82, flow separation of the streamlines 28 on the bottom surface 80 is prevented when the control surface 78 assumes an active position depressed substantially beyond positions heretofore possible in the absence of such a device. Of course, it will be appreciated that the more vertical a chord plane of the control surface 78 becomes, the less of an area the control surface 78 projects to the downwardly directed slipstream.

Although flow separation on the bottom surface 80 can be effectively controlled by means of the panel 82, flow separation may occur on a top surface 102 (FIG. 7) of the control surface 78 if the control surface is depressed beyond a certain position. Therefore, to permit the control surface 78 to be depressed to the extent that it projects the least area into the downwardly directed slipstream while preventing flow separation on the top surface 102, a regulating device (FIG. 8) in the form of a slat member 104 is provided adjacent a fore edge 106 of the control surface 78. A suitable link 108 pivotally connects the slat member 104 to the control surface 78 so that when the slat member 104 is in a protracted position (solid lines in FIG. 8) it serves to collect the slipstream and guide it around the top surface 102 and when suitably positioned maintains the flow of the slipstream along said top surface all the way to an aft edge 110 of the control surface 78. As illustrated in FIG. 9, the streamlines 28 advancing along the top surface 80 retain a smooth-flow condition. To move the slat member 104 from a withdrawn position (phantom lines in FIG. 8) proximate the fore edge 106 when the control surface 78 is in its inactive position and a protracted position spaced from the fore edge when the control surface 78 is in the active position, a motor 112 or other suitable drive mechanism rotates a pinion 114 drivingly engaged with an arcuate rack 116 suitably mounted to the slat member 104. The motor 112 may be suitably energized upon actuation of the switch 94.

An alternate arrangement of the regulating device shown in FIG. 8 may be provided as shown in FIG. 10 in which a modified slat member 118 is povotally mounted to the fore edge 106 by means of a hinge 120 at a rear edge 122 of the slat member. In this manner, the slat member 118 prevents substantial flow of the slipstream along the top surface 102 but directs the flow along the bottom surface 80 and aids the panel 82 in preventing flow separation from the control surface 78.

By employing the forward control mechanism 42 in combination with the aft control mechanism 44, it is possible to contract the reduced pressure region 38 to the least possible magnitude and to delay flow separation beneath the wing 24 for a predetermined distance. Since experience has indicated that download is minimized if flow separation is prevented for a distance beneath the wing 24 equal to at least two chord lengths of the wing, the control mechanisms 42 and 44 can be beneficially employed in combination to achieve substantial improvement in the performance of the aircraft 20.

While the invention has been illustrated and disclosed with reference to preferred embodiments, it is to be understood that various changes and modifications can be made within the spirit of the invention.

What is claimed is:

1. A vertical take-off and landing aircraft comprising: a vehicle body and means providing a downwardly moving slipstream, said body including an airfoil having leading and trailing portions and upper and lower surfaces defining a fore cavity, and control means including an upper vane adjacent said leading portion and movable between a closed position substantially flush with said upper surface and an open position upwardly disposed relative to said upper surface and a lower vane adjacent said leading portion and movable between a closed position substantially flush with said lower surface and an open position downwardly disposed relative to said lower surface, said upper and lower vanes in their said respective open positions permitting flow of said slipstream from a first zone above said body through said fore cavity to a second zone beneath said body.

2. An aircraft as set forth in claim 1 wherein said control means includes a hinge pivotally mounting said upper and lower vanes on a common axis and actuating means for moving said upper and lower vanes on said hinge from said closed to said open positions.

3. An aircraft as set forth in claim 2 wherein said actuating means includes a forward control rod longitudinally movable between a retracted position and an extended position, an actuator for moving said forward control rod from said retracted position to said extended position, a track for guiding said forward control rod during movement from said retracted position to said extended position, upper and lower links respectively pivotally connecting said forward control rod to said upper and lower vanes, such that said upper and lower vanes assume said closed position when said forward control rod is in said retracted position and assume said open positions when said forward control rod is in said extended position.

4. An aircraft as set forth in claim 3 wherein said airfoil includes a fairing proximate said forward cavity and spaced from said hinge in a direction toward said trailing portion for guiding, together with said upper and lower vanes, said slipstream from said first zone to said second zone.

5. An aircraft as set forth in claim 3 wherein said airfoil includes a chord plane, said upper link being effective to hold said upper vane substantially perpendicular relative to said chord plane and said lower link being effective to hold said lower vane in a plane extending downwardly of said chord plane and slightly rearwardly when said control rod is in said extended position.

6. A vertical take-off and landing aircraft comprising: a vehicle body, means providing a downwardly moving slipstream and said body including an airfoil having leading and trailing portions and upper and lower surface defining a chord plane and an aft cavity intermediate said leading and trailing portions, control means, said control means including first guide means for directing said slipstream beneath said body means and second guiding means for conducting said slipstream onto and along said first guide means, said first guide means including a control surface adjacent said aft cavity having a top surface and a bottom surface and movable between an inactive position substantially within said chord plane and an active position inclined downwardly relative to said chord plane and said second guiding means includes a panel adjacent said control surface and movable between a lowered position flush with said upper surface and a raised position inclined upwardly and generally toward said leading edge, said panel adapted to direct said slipstream from a zone above said body through said aft cavity and onto and along said bottom surface so as to maintain streamline flow of said slipstream for a substantial distance beyond said lower surface and to reduce the effective size of a reduced pressure region beneath said body.

7. An aircraft as set forth in claim 6 wherein said airfoil includes a cove member mounted for movement from a rearward position adjacent said control surface to a forward position spaced from said control surface in response to movement of said panel from said lowered position to said raised position.

8. An aircraft as set forth in claim 7 wherein said cove member includes a concave surface pivotally mounted to said airfoil adjacent said lower surface, hinge elements pivotally connecting said cove member to said panel distant from said lower surface, and including actuating means for moving said control surface from said inactive position to said active position and for moving said panel from said lowered position to said raised position.

9. An aircraft as set forth in claim 8 wherein said actuating means includes an aft control rod pivotally connected to said control surface and longitudinally movable between a retracted position at which said control surface is in said inactive position and an extended position at which said control surface is in said active position, an actuator for moving said aft control rod from said retracted to said extended position, an operating unit responsive to a predetermined position of said aft control rod for moving said panel from said lowered position to said raised position.

10. An aircraft as set forth in claim 9 wherein said operating unit includes an extensible member pivotally connected to said panel and operable to move said panel from said lowered position to said raised position, means including a switch for operating said extensible member, and means on said aft control rod for activating said switch when said aft control rod reaches said predetermined position.

11. A vertical take-off and landing aircraft comprising: a vehicle body and means providing a downwardly moving slipstream, said body including an airfoil having leading and trailing portions and upper and lower surfaces defining an aft cavity and a chord plane, a cove member intermediate said leading and trailing portions a control means for reducing the area of said body means exposed to said slipstream and for guiding said slipstream from a first zone above said body means to a second zone beneath said body means, said control means including, a control surface adjacent said cove member having top and bottom surfaces and fore and aft edges and movable between an inactive position substantially within said chord plane and an active position inclined downwardly relative to said chord plane, and a slat member pivotally mounted to said fore edge at a rear edge of said slat member and movable between a withdrawn position proximate said fore edge and a protracted position spaced from said fore edge in response to movement of said control surface from said inactive position to said active position.

12. An aircraft as set forth in claim 11 including means for moving said slat member from said withdrawn position to said protracted position upon movement of said control surface from said inactive to said active position.

References Cited

UNITED STATES PATENTS

| | | | |
|---|---|---|---|
| 1,754,571 | 4/1930 | Podolsky | 244—12 |
| 2,580,312 | 12/1951 | Moore | 244—7 |
| 2,959,373 | 11/1960 | Zuck | 244—7 |
| 3,114,519 | 12/1963 | Carter | 244—12 |
| 3,128,966 | 4/1964 | Alvarez-Calderon | 244—42 |
| 3,275,266 | 9/1966 | Cockerell | 244—42 |
| 3,326,500 | 6/1967 | Lanier | 244—42 |
| 3,430,894 | 3/1969 | Strand et al. | 244—12 X |
| 1,822,179 | 9/1931 | Thomas | 244—42.4 X |

MILTON BUCHLER, Primary Examiner

J. E. PITTENGER, Assistant Examiner

U.S. Cl. X.R.

244—42